United States Patent
Ikeya

(10) Patent No.: US 8,909,387 B2
(45) Date of Patent: Dec. 9, 2014

(54) OPERATION VEHICLE MONITORING DEVICE

(75) Inventor: Hiroki Ikeya, Hiratsuka (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 13/514,367

(22) PCT Filed: Dec. 17, 2010

(86) PCT No.: PCT/JP2010/072787
§ 371 (c)(1),
(2), (4) Date: Jun. 7, 2012

(87) PCT Pub. No.: WO2011/074672
PCT Pub. Date: Jun. 23, 2011

(65) Prior Publication Data
US 2012/0245760 A1    Sep. 27, 2012

(30) Foreign Application Priority Data
Dec. 18, 2009    (JP) .................................. 2009-288498

(51) Int. Cl.
*G05D 1/00*    (2006.01)
*E02F 9/26*    (2006.01)
*B60R 1/00*    (2006.01)

(52) U.S. Cl.
CPC ........... *E02F 9/267* (2013.01); *B60R 2300/207* (2013.01); *B60R 1/00* (2013.01)
USPC ........................................................... 701/1

(58) Field of Classification Search
CPC .. G07F 19/20; H04N 2201/0094; B60T 8/172
USPC ....................................................... 701/1, 11
See application file for complete search history.

(56) References Cited

U.S. PATENT DOCUMENTS

| 4,926,331 A * | 5/1990 | Windle et al. ................. 701/34.3 |
| 6,766,231 B2 | 7/2004 | Nakagawa et al. |

(Continued)

FOREIGN PATENT DOCUMENTS

| CN | 1382879 A | 12/2002 |
| EP | 1662054 A1 | 5/2006 |

(Continued)

OTHER PUBLICATIONS

International Search Report dated Mar. 29, 2011, issued for PCT/JP2010/072787.

(Continued)

*Primary Examiner* — James Trammell
*Assistant Examiner* — Michael D Lang
(74) *Attorney, Agent, or Firm* — Edwards Wildman Palmer LLP

(57) ABSTRACT

To provide an operation vehicle monitoring device that can reduce man hours for maintenance and realize the maintenance efficiency, it includes an input unit (201) in which a signal for instructing registration of a selected monitoring item is input, a display unit (202) that sequentially updates and displays the current detection content of a monitoring item selected from a plurality of monitoring items related to the operation state of the construction machine, a memory (206) that registers the monitoring item for which the signal for instructing the registration is input by the input unit (201), and a controller (203) that causes the display unit (202) to display the current detection content of the registered monitoring item when there is the monitoring item registered in the memory (206).

3 Claims, 15 Drawing Sheets

(56) References Cited

U.S. PATENT DOCUMENTS

| | | |
|---|---|---|
| 7,356,387 B2 * | 4/2008 | Morris et al. .................... 701/1 |
| 2006/0017552 A1 * | 1/2006 | Andreasen et al. ........... 340/438 |
| 2007/0180166 A1 * | 8/2007 | Southerland et al. ........... 710/65 |
| 2008/0189070 A1 * | 8/2008 | Conte et al. ................... 702/130 |
| 2009/0207009 A1 * | 8/2009 | Kiesewetter et al. ......... 340/442 |

FOREIGN PATENT DOCUMENTS

| | | |
|---|---|---|
| JP | 2002-275949 A | 9/2002 |
| JP | 2002-317472 A | 10/2002 |
| JP | 2005-163378 A | 6/2005 |
| JP | 2005-308436 A | 11/2005 |
| JP | 2009-155841 A | 7/2009 |

OTHER PUBLICATIONS

Office Action dated Dec. 6, 2012, issued for the corresponding Swedish patent application.

Decision of a Patent Grant dated Jan. 15, 2013, issued for the Chinese patent application No. 201080056748.3 and English translation thereof.

* cited by examiner

FIG.17
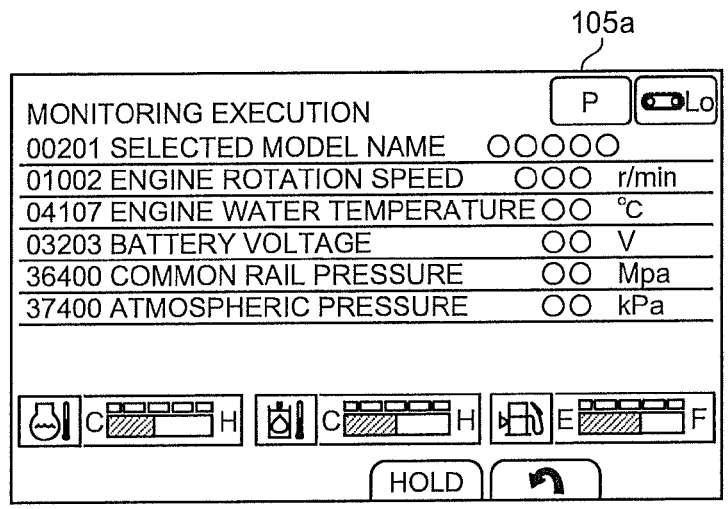
↓ KEY-OFF
TURNS OFF LIGHT OF SCREEN
↓ KEY-ON
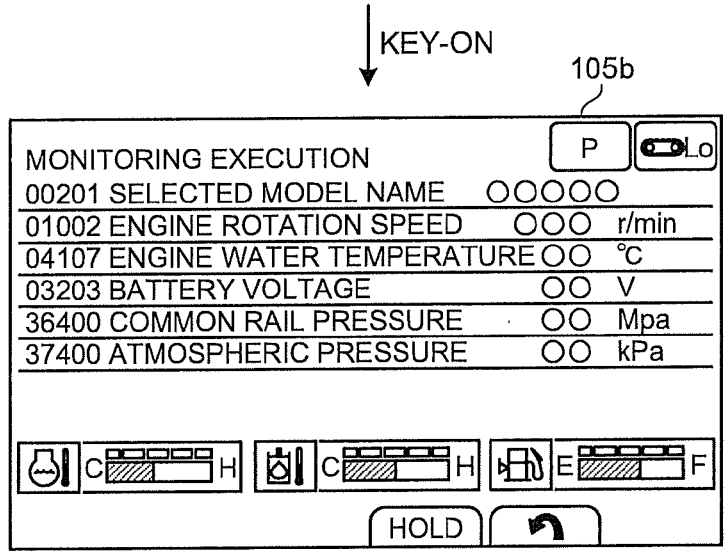

OPERATION VEHICLE MONITORING DEVICE

FIELD

The present invention relates to an operation vehicle monitoring device that is provided in an operation vehicle such as a construction machine and displays information related to the operation vehicle.

BACKGROUND

Regarding a construction machine such as a hydraulic shovel, there is a case where, when performing various maintenances, a service personnel performs the operations while checking an operational state of the construction machine. In such a case, there is a known technique of monitoring an internal state of the construction machine using a monitoring device mounted on the construction machine (for example, see Patent Literature 1). This monitoring device has a function of displaying a maintenance screen in addition to a standard screen for displaying a normal operation of the construction machine, and can sequentially update and display a detection result of monitoring items selected by the service personnel. By such a technique, the service personnel can perform monitoring without connecting another terminal to the construction machine.

CITATION LIST

Patent Literature

Patent Literature 1: Japanese Patent Application Laid-Open No. 2002-317472

SUMMARY

Technical Problem

However, in the above related art, when maintenance is finished and a normal operation restarts, information about monitoring items selected at the time of maintenance is deleted. Therefore, when the maintenance is performed later again, it is necessary to select a monitoring item in each case among 200 or more kinds of monitoring items depending on the construction machine model, which places a heavy burden on the service personnel. Also, in a case where the same construction machine is maintained, similar monitoring items are often selected every time, which is inefficient.

The present invention is made in view of the above and it is an object of the present invention to provide an operation vehicle monitoring device that can reduce the man hour for maintenance and realize the maintenance efficiency.

Solution to Problem

According to an aspect of the present invention, an operation vehicle monitoring device includes a display unit configured to display a standard screen that displays an operation state of an operation vehicle, and a service menu display screen for performing a maintenance and setting of the operation vehicle. The service menu display screen is transitioned from the standard screen by a predetermined operation and displayed. The service menu display screen displays a plurality of menus related to the maintenance and setting of the operation vehicle, a monitoring item selection screen is shifted and displayed in which it is possible to select a plurality of monitoring items corresponding to a selected menu in case where one of the plurality of menus is selected, and the display unit displays a monitoring item selected from the plurality of monitoring items related to the operation state of the operation vehicle. The operation vehicle monitoring device includes: an input unit configured to input a signal that instructs a registration of the selected monitoring item; a storage unit configured to register the monitoring item according to the input signal; and a display control unit configured to force the display unit to display the monitoring item registered in the storage unit.

Advantageously, in the operation vehicle monitoring device, the display unit displays a plurality of tabs that can be switched to each other in a screen displaying the plurality of monitoring items, and one of the plurality of tabs corresponds to a screen displaying a list of monitoring items registered in the storage unit.

Advantageously, the operation vehicle monitoring device further includes a signal detection unit configured to detect a key-on signal and a key-off signal generated when a key switch of the operation vehicle is turned on and off, respectively. In a case where the signal detection unit detects the key-on signal after detecting the key-off signal, the display control unit causes the display unit to display a current detection content of the monitoring items registered in the storage unit.

Advantageously, in the operation vehicle monitoring device, in a case where the signal detection unit detects the key-on signal in a predetermined time after detecting the key-off signal, the display control unit forces the display unit to display the current detection content of the monitoring items registered in the storage unit.

Advantageously, in the operation vehicle monitoring device, the display unit displays the current detection content of the monitoring items and displays, by a graphic or a character, at least part of a plurality of gauges displaying a plurality of state quantity levels of the operation vehicle upon a normal operation of the operation vehicle.

Advantageously, in the operation vehicle monitoring device, the monitoring item relates to a hydraulic pump and/or an engine mounted on the operation vehicle.

Advantageous Effects of Invention

An operation vehicle monitoring device according to an aspect of the present invention can register a monitoring item displayed by a display unit in a storage unit and display the registered monitoring item on the display unit, so that a service personnel does not need to select a monitoring item at every maintenance. Therefore, it is possible to provide an advantage of reducing man hour for maintenance and realizing the maintenance efficiency.

BRIEF DESCRIPTION OF DRAWINGS

FIG. 17 is a diagram illustrating an outline of characteristic processing in monitoring processing performed by a monitoring device according to Embodiment 3 of the present invention.

DESCRIPTION OF EMBODIMENTS

In the following, embodiments of the present invention will be explained with reference to the accompanying drawings.

Embodiment 1

Figure 1:
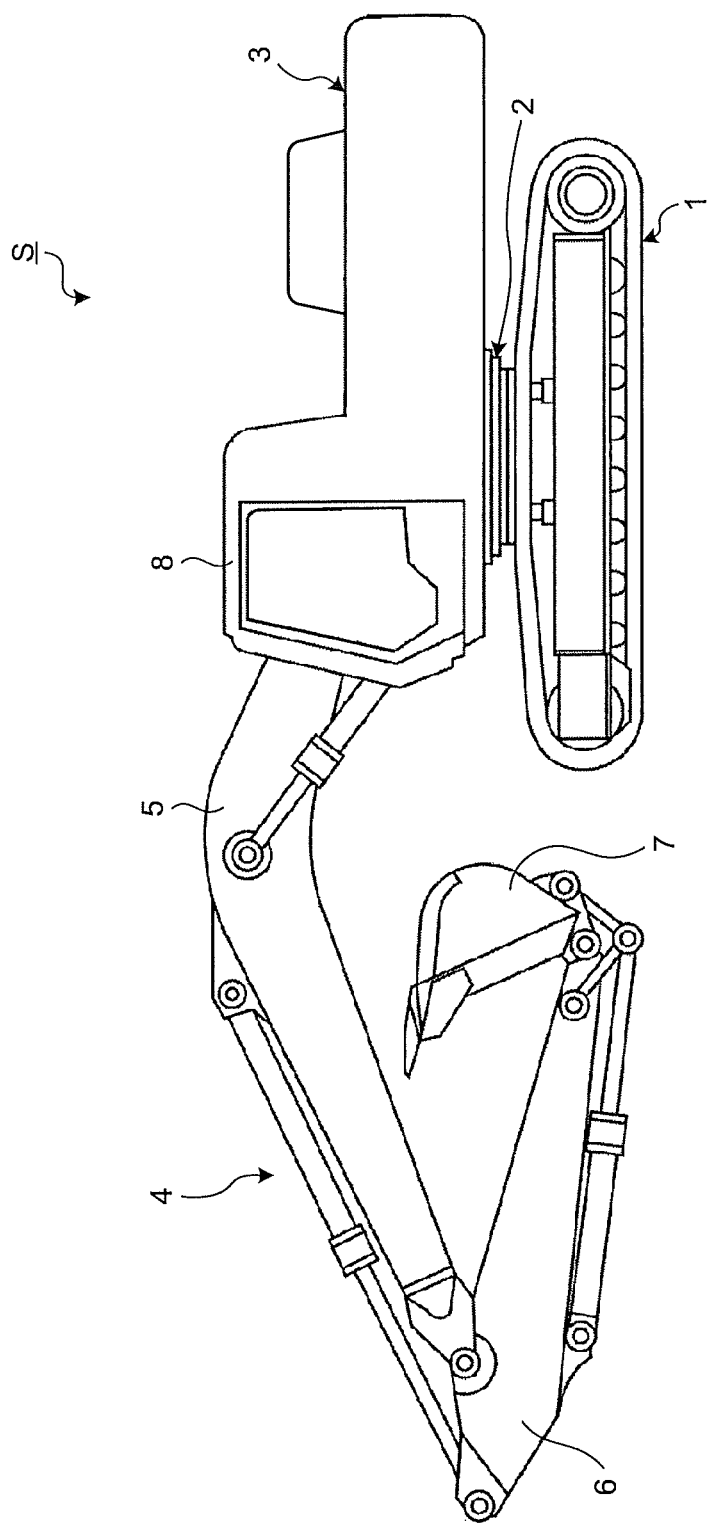
FIG. 1 is a schematic diagram illustrating a construction machine of an operation vehicle mounting an operation vehicle monitoring device according to Embodiment 1 of the present invention.

FIG. 1 is a schematic diagram illustrating a construction machine of an operation vehicle mounting an operation vehicle monitoring device (hereinafter simply referred to as "monitoring device") according to Embodiment 1 of the present invention. A construction machine S illustrated in the figure is a hydraulic shovel and includes a base carrier 1 having a crawler track or the like, an upper swing body 3 swingably mounted on an upper portion of the base carrier 1 via a swing mechanism 2, and an operating machine 4 connected to the upper swing body 3. The operating machine 4 includes a boom 5 whose basal portion is swingably connected to the upper swing body 3, an arm 6 swingably connected to the front edge of the pool 5, and a bucket 7 swingably connected to the front edge of the arm 6. Also, the upper swing body 3 includes a driver's cabin or the like.

Figure 2:
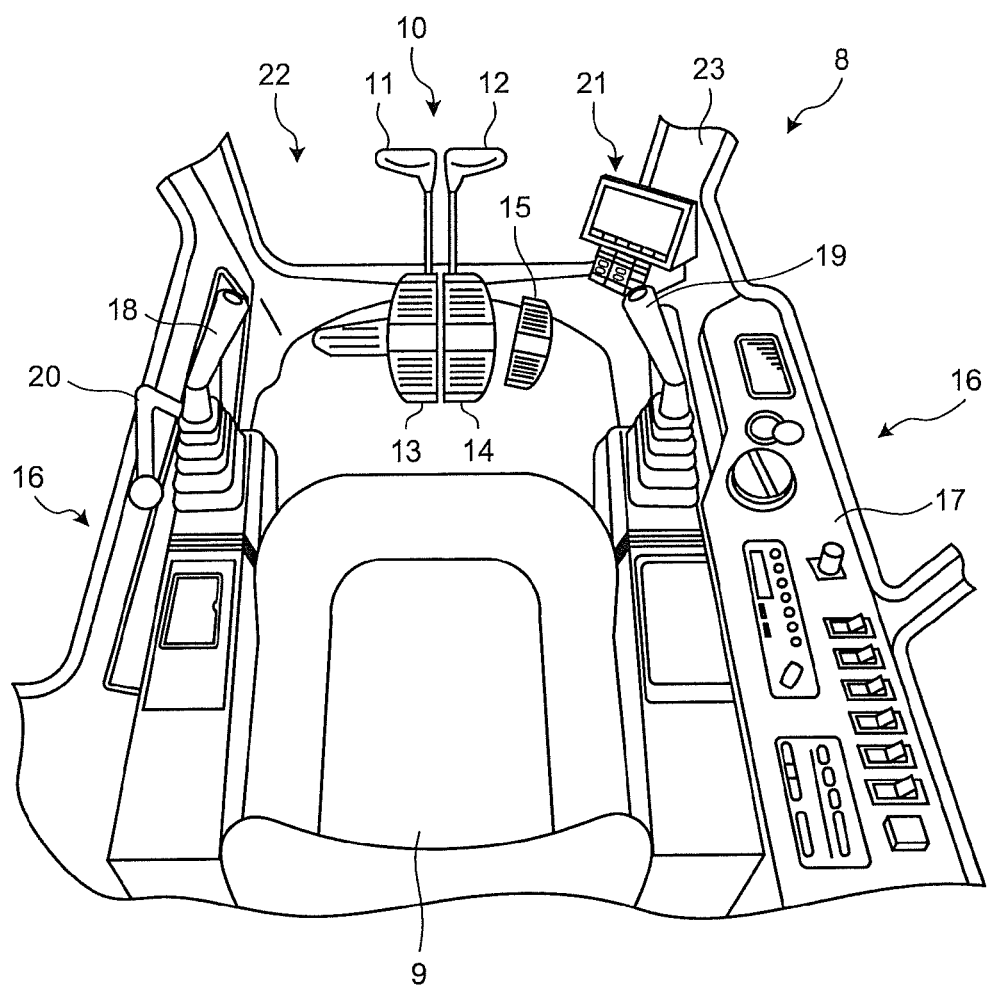
FIG. 2 is a perspective view illustrating an internal configuration of a driver's cabin of the construction machine mounting the operation vehicle monitoring device according to Embodiment 1 of the present invention.

FIG. 2 is a perspective view illustrating an internal configuration of the driver's cabin 8. As illustrated in FIG. 2, the driver's cabin 8 includes a driving seat 9 in the central portion and provides a run operation unit 10 forward this driving seat 9. This run operation unit 10 includes traction levers 11 and 12 and traction pedals 13 and 14 swung integrally with the traction levers 11 and 12. When an operator pushes the traction levers 11 and 12 forward, the base carrier 1 travels forward, while, when the operator pulls the traction levers 11 and 12 backward, the base carrier 1 travels backward. An attachment pedal 15 is provided near the run operation unit 10. Also, an instrument panel 17 is provided near a right side window 16 in FIG. 2.

In the right and left side portions of the driving seat 9, operating machine levers 18 and 19 are installed respectively. The operating machine levers 18 and 19 implement an up-and-down motion of the boom 5, rotation of the arm 6 and the bucket 7, swing operation of the upper swing body 3, and so on. Further, a lock lever 20 is provided near the operating machine lever 18. Here, the lock lever 20 is used to stop functions such as an operation of the operating machine 4, a swing of the upper swing body 3 and a travel motion of the base carrier 1. That is, by performing a pull-up operation of the lock lever 20, it is possible to lock (i.e. prohibit) a motion of the operating machine 4 or the like. In a state in which the motion of the operating machine 4 or the like is locked by the lock lever 20, the operating machine 4 or the like is not operated even if the operator operates the operating machine levers 18 and 19 or the like.

In the lower portion of a vertical frame 23 separating a front window 22 from one side window 16 in the driver's cabin 8, there is provided a monitoring device 21 that displays, for example, an engine condition of the construction machine S. Here, the engine condition denotes, for example, a temperature of engine cooling water, a hydraulic oil temperature or a remaining fuel amount and the like.

Figure 3:
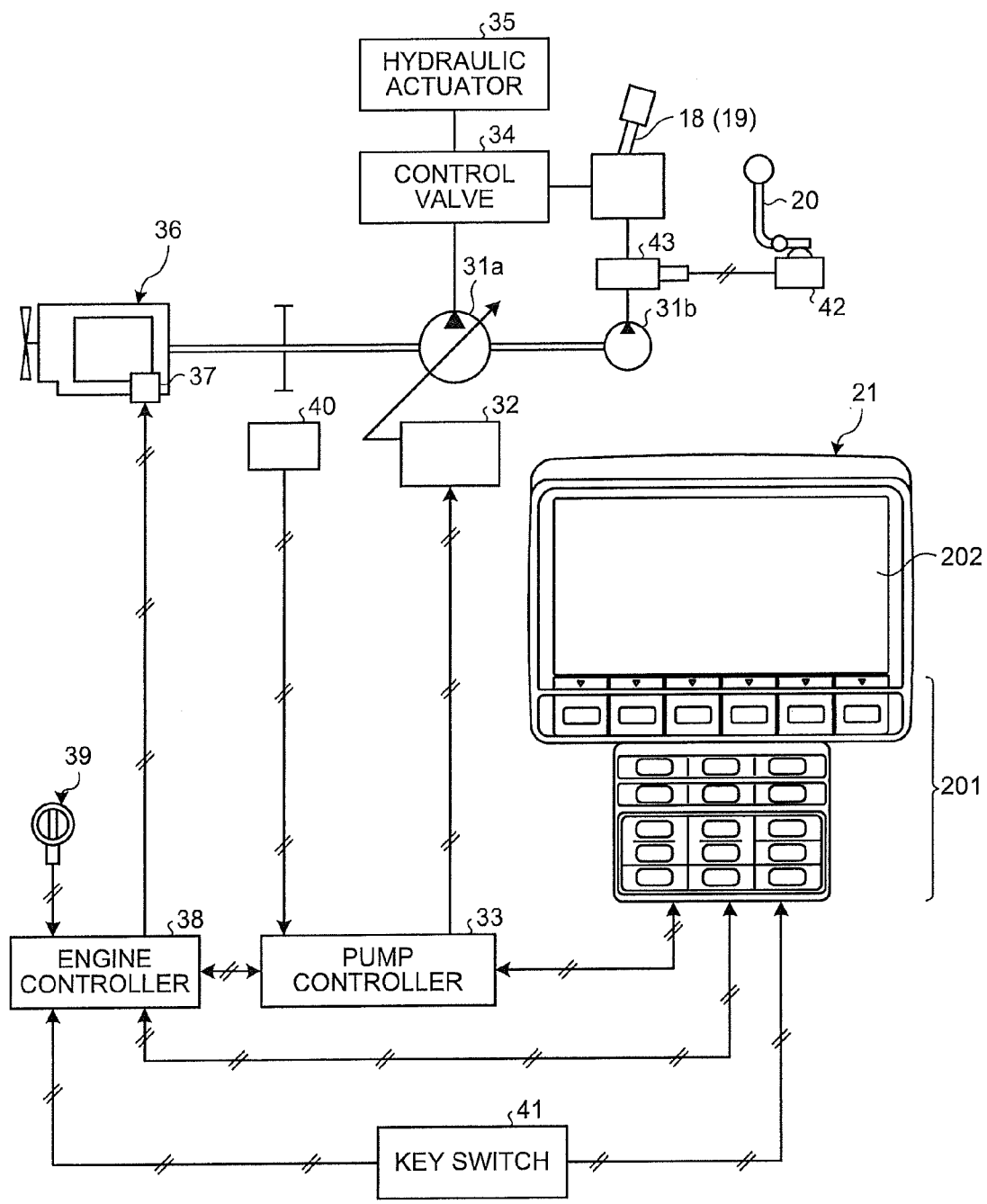
FIG. 3 is a schematic diagram illustrating a configuration of an operation vehicle control system according to Embodiment 1 of the present invention.

FIG. 3 is a schematic diagram illustrating a configuration of a control system of the construction machine S. As illustrated in FIG. 3, the control system of the construction machine S includes a first hydraulic pump 31a that injects a pressure oil for generating an oil pressure to drive the operating machine 4 or the like, and a second hydraulic pump 31b that injects a pressure oil for generating an oil pressure corresponding to operations of the operating machine levers 18 and 19. A swash plate driving device 32 is connected to the first hydraulic pump 31a. The swash plate driving device 32 drives based on an instruction from a pump controller 33 and changes the inclination angle of the swash plate of the first hydraulic pump 31a. A hydraulic actuator 35 is connected to the first hydraulic pump 31a via a control valve 34. The hydraulic actuator 35 denotes, for example, a boom cylinder, an arm cylinder, a bucket cylinder, a swing hydraulic motor, a running hydraulic motor and the like. Also, the operating machine lever 18 (19) and the lock lever 20 are connected to the second hydraulic pump 31b.

Further, the control system of the construction machine S includes an engine 36 having a drive shaft connecting the first hydraulic pump 31a and the second hydraulic pump 32b, a common rail 37 that adjusts the amount of fuel injection by a fuel injection device in the engine 36, and an engine controller 38 that controls operations of the engine 36. The engine 36 is a diesel engine. The engine rotation speed of the engine 36 is set by a fuel dial 39 and the actual engine rotation speed is detected by a rotation sensor 40. The engine controller 38 controls, for example, the fuel injection amount in the fuel injection device based on, for example, a lever operation signal by the operator or sensor signals of various sensors set in the operating machine 4 or the like. The pump controller 33 performs control such that the first hydraulic pump 31a absorbs the best matching torque at each output point of the engine 36, based on the pump absorption torque set every operation mode of the construction machine S, the engine rotation speed set in the fuel dial 39 and the actual engine rotation speed. Here, as the operation mode, for example, it is possible to set a "heavy excavation mode" that can maintain a large value of workload corresponding to the excavation amount per unit time or a "fuel saving mode" that further suppresses fuel consumption at the time of light load operation.

A key switch 41 is connected to the engine controller 38, where the key switch inputs a key-on signal and key-off signal to instruct the activation and deactivation of an engine operation. The key switch 41 is applicable in which: a key is inserted into a so-called key cylinder to generate electrical signals (i.e. key-on signal and key-off signal) by a rotation operation; the electrical signals are generated when authentication is given using an electronic key having an immobilizer; or the electrical signals are generated by a push button.

A PPC lock switch 42 is connected to the lock lever 20. When the lock lever 20 is operated to the lock side, the PPC lock switch 42 detects the operation and sends a signal to a valve (i.e. solenoid valve) 43. By this means, it is possible to stop functions such as an operation of the operating machine 4, a swing of the upper swing body 3 and a travel motion of the base carrier 1. At this time, the engine 36 has the idle rotation speed and becomes an idling state.

Figure 4:
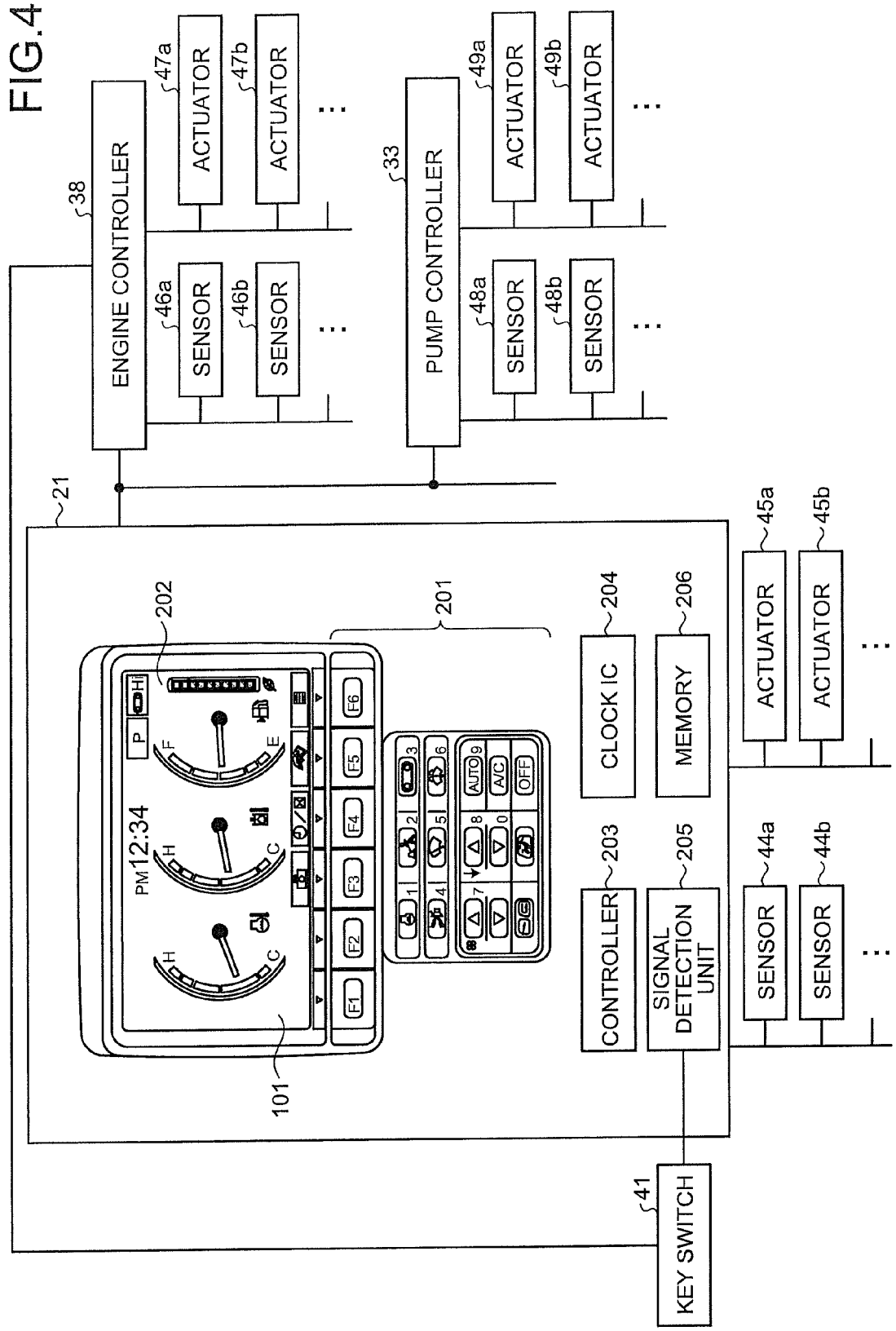
FIG. 4 is a block diagram illustrating a functional configuration of the operation vehicle monitoring device according to Embodiment 1 of the present invention and a configuration of control system elements with respect to the monitoring device.

FIG. 4 is a block diagram illustrating a functional configuration of the monitoring device 21 and a configuration of control system elements with respect to the monitoring device 21. The monitoring device 21 includes an input unit 201 in which an operator or service personnel inputs various instructions or information, a display unit 202 that displays various kinds of information including information related to operations of the construction machine, and a controller 203 as a display control unit that controls the operations of the monitoring device 21. The display unit 202 has a function of sequentially updating and displaying the current detection content of a monitoring item selected from a plurality of monitoring items related to the operation state of the construction machine.

Further, the monitoring device 21 includes a clock IC 204 having a function of deciding the key-on or key-off time, a signal detection unit 205 that detects a signal input from the key switch 41, and a memory 206 as a storage unit that is realized using an EEPROM or the like to store, for example, the plurality of monitoring items related to the operation state of the construction machine, information input by the input unit 201 and a program to operate the monitoring device 21.

The monitoring device 21 having the above configuration is connected to, for example, a plurality of sensors 44a, 44b and so on including a temperature sensor that detects the air conditioner temperature in the driver's cabin 8 of the construction machine S, and actuators 45a, 45b and so on configured to perform operations corresponding to detection results detected in the plurality of sensors 44a, 44b and so on.

The engine controller 38 includes the rotation sensor 40 and a temperature sensor that detects the water temperature of engine cooling water, and is connected to a plurality of sensors 46a, 46b and so on that detect the engine driving state, and actuators 47a, 47b and so on that drive the engine based on detection results in the plurality of sensors 46a, 46b and so on. The actuators 47a, 47b and so on include a governor motor 37.

The pump controller 33 is connected to a plurality of sensors 48a, 48b and so on including a compression sensor that detects the oil pressure in a predetermined position of a hydraulic circuit including the first hydraulic pump 31a and the second hydraulic pump 31b, and a plurality of actuators 49a, 49b and so on that control operations of the operating machine 4 based on detection results detected in the plurality of sensors 48a, 48b and so on. The plurality of actuators 49a, 49b and so on include an actuator that adjusts the tilt angle of tilt slope of the first hydraulic pump 31a, and a boom cylinder, an arm cylinder, a bucket cylinder, a swing hydraulic motor and a running hydraulic motor forming the hydraulic actuator 35.

Figure 5:
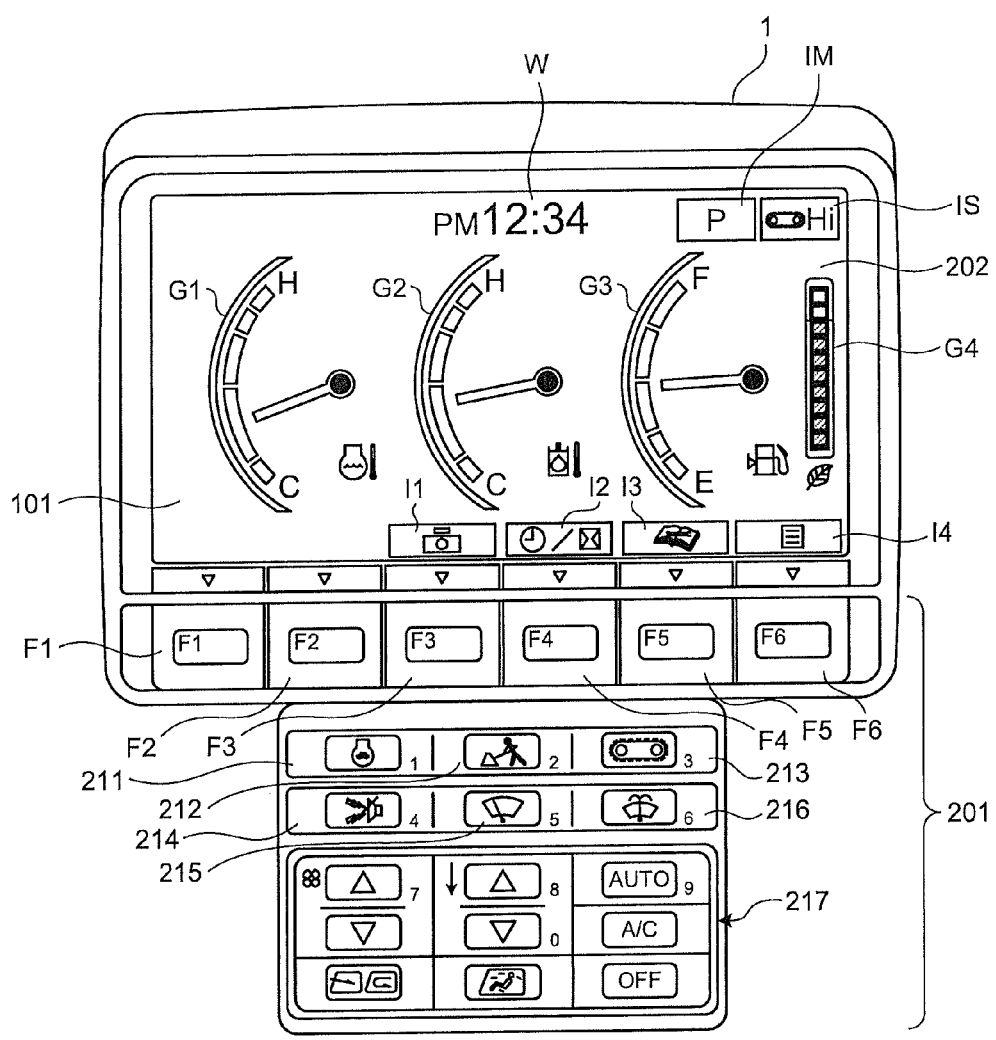
FIG. 5 is a diagram illustrating an appearance configuration of the operation vehicle monitoring device according to Embodiment 1 of the present invention.

FIG. 5 is a diagram illustrating an appearance configuration of the monitoring device 21. As illustrated in FIG. 5, the input unit 201 is configured with a plurality of switches. In the input unit 201, function switches F1 to F6 placed below the display unit 202 and displayed as "F1" to "F6" denote switches to input signals corresponding to the icons displayed above the switches by the display unit 202. Below the function switches F1 to F6, there are provided: an auto decel switch 211 that performs auto decel control of reducing the engine rotation speed of the engine 36 to predetermined rotation speed when the operating machine levers 18 and 19 are returned to neutral positions; an operation mode selection switch 212 that selects an operation mode of the construction machine S from a plurality of operation modes; a running velocity stage selection switch 213 that selects the running velocity stage of the construction machine S from a plurality of running velocity stages; a buzzer cancel switch 214 that cancels buzzer sound generated when the construction machine S is in a predetermined warning condition; a wiper switch 215 that operates a wiper (not shown) set on the windshield of the driver's cabin 8 (see FIG. 5); a washer switch 216 that operates a washer (not shown) to inject cleaning water to the windshield; and an air conditioner switch 217 that operates various functions of the air conditioner in the driver's cabin 8. Here, as the input unit 201, a touch panel such as a resistance film system is equally applicable.

In FIG. 5, a screen displayed by the display unit 202 denotes a standard screen displayed during a normal operation of the construction machine. Here, the "normal operation" denotes an operation at the time when the construction machine performs processing. For example, when the construction machine is a hydraulic shovel, the normal operation means an operation at the time when processing such as soil excavation is performed. The standard screen 101 displays at least one of an engine water temperature gauge G1 indicating the water temperature of engine cooling water, an operating oil temperature gauge G2 indicating the operating oil temperature in the hydraulic circuit and a fuel level gauge G3 indicating the remaining fuel amount level, where the needles of these gauges swing based on their corresponding sensor signals. Further, a fuel consumption gauge G4 is displayed on the right side of the fuel level gauge G3. A clock W is displayed in the upper central portion of the display unit 202. On the right side of the clock W, an operation mode icon $I_M$ indicating a set operation mode and a running velocity stage icon $I_S$ indicating a set running velocity stage are displayed.

In the standard screen 101, character "P" is displayed as the operation mode icon $I_M$. This corresponds to a display in a case where the operation mode is set to the heavy excavation mode. By contrast with this, when the construction machine S is set to the fuel saving mode, character "E" is displayed as the operation mode icon $I_M$.

Also, the standard screen 101 displays an icon containing character string "Hi" as the running velocity stage icon $I_S$. This icon indicates a display in a case where the running velocity stage is set to high speed. The running velocity stage selected and input via the running velocity stage selection switch 213 includes three kinds of low speed, medium speed and high speed. Among these, when the low speed is selected, an icon containing character string "Lo" is displayed as the running velocity stage icon $I_S$. Also, when the medium speed is selected, an icon containing character string "Mi" is displayed as the running velocity stage icon $I_S$.

In the positions below the standard screen 101 but above the function switches F3 to F6, guidance icons I1 to I4 corresponding to function switches F3 to F6, respectively, are displayed. Among these, the guidance icon I1 denotes an icon indicating that a screen displayed by the display unit 202 is switched to a camera screen. The camera screen denotes a screen outputted by a camera such as a CCD camera (not shown) which is set on an exterior portion of the construction machine S and images the outside world of the construction machine S. Also, the guidance icon I2 denotes an icon indicating that a display of the clock W is switched to a display of a service meter. Also, the guidance icon I3 denotes an icon indicating that the screen displayed by the display unit 202 is switched to a maintenance mode screen for performing maintenance. Also, the guidance icon I4 denotes an icon indicating that the screen displayed by the display unit 202 is switched to a user mode screen for adjusting the brightness and setting the clock. Therefore, for example, when the function switch F3 corresponding to the guidance icon I1 is pressed to input a signal, the controller 203 performs control of switching the screen displayed by the display unit 202 and displaying, for example, a camera screen of the backward of the construction machine imaged by a camera set on the exterior of the construction machine.

Figure 6:
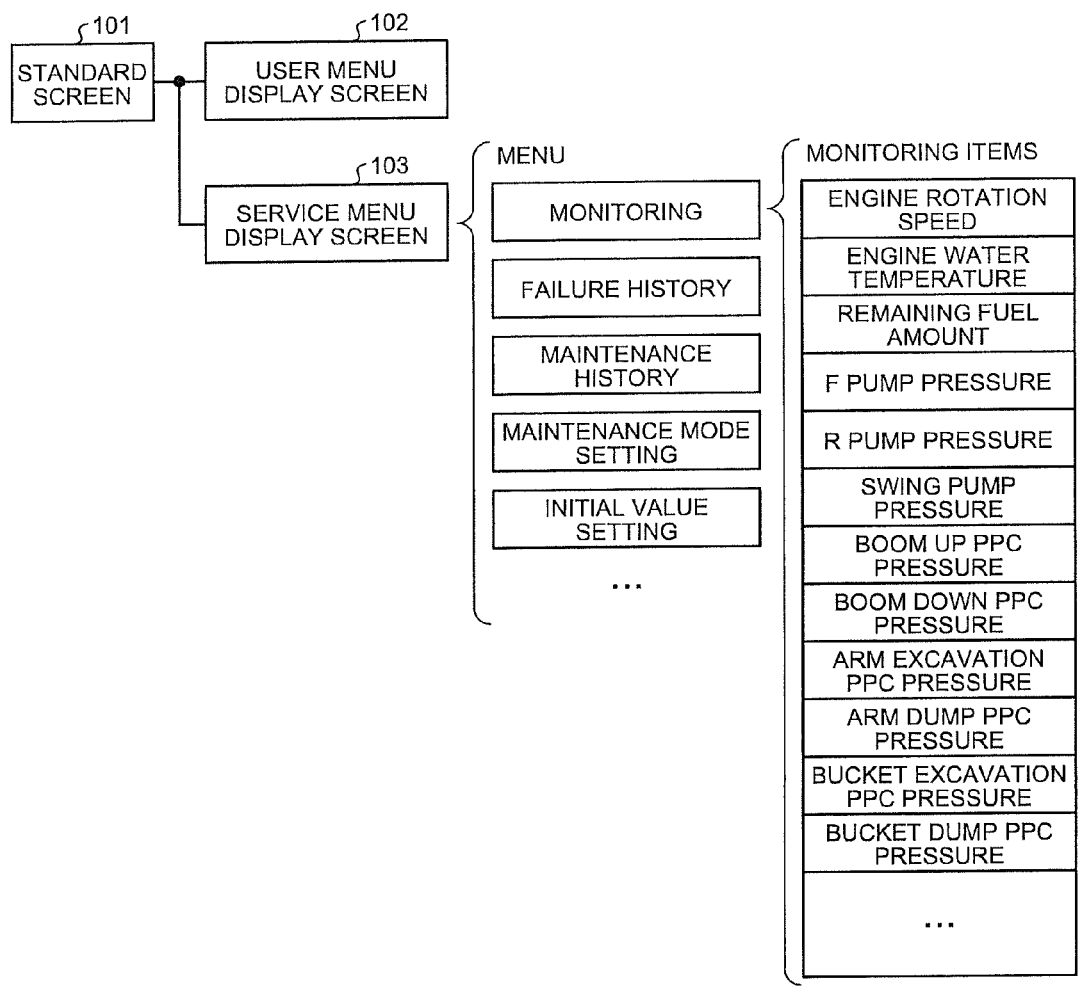
FIG. 6 is a diagram illustrating screen content displayed by a display unit of the operation vehicle monitoring device according to Embodiment 1 of the present invention.

FIG. 6 is a diagram illustrating screen content displayed by the display unit 202. In the display unit 202, it is possible to switch the standard screen 101 to a user menu display screen 102 for performing setting by a general user (i.e. operator who operates the vehicle) or a service menu display screen 103 for performing setting by a manager. Here, the "manager" denotes, for example, a manager of a rental company of the construction machine or a service personnel of a delivery agent of the construction machine. Here, the switching from the standard screen 101 to the service menu display screen 103 is performed via an input of a password that is not known by the general user and an execution of a special operation. Thus, it is desirable to perform setting such that the general user cannot switch to the service menu display screen 103.

In the service menu display screen 103, the manager can display a menu required to perform failure diagnosis or defect analysis. To be more specific, examples of the displayed menu include "monitoring" for displaying a detection result of items selected from items detected by various sensors connected to the monitoring device 21, the engine controller 38 or the pump controller 33, "failure history" for displaying the history of failure, "maintenance history" for displaying the history of maintenance, "maintenance mode setting" for performing mode setting upon maintenance and "initial value setting" for setting the existence or non-existence of optional features and the initial value of monitoring. Among these, the monitoring items selected in the monitoring menu include "engine rotation speed," "engine water temperature", "remaining fuel amount" and the like as shown in FIG. 6.

Figure 7:
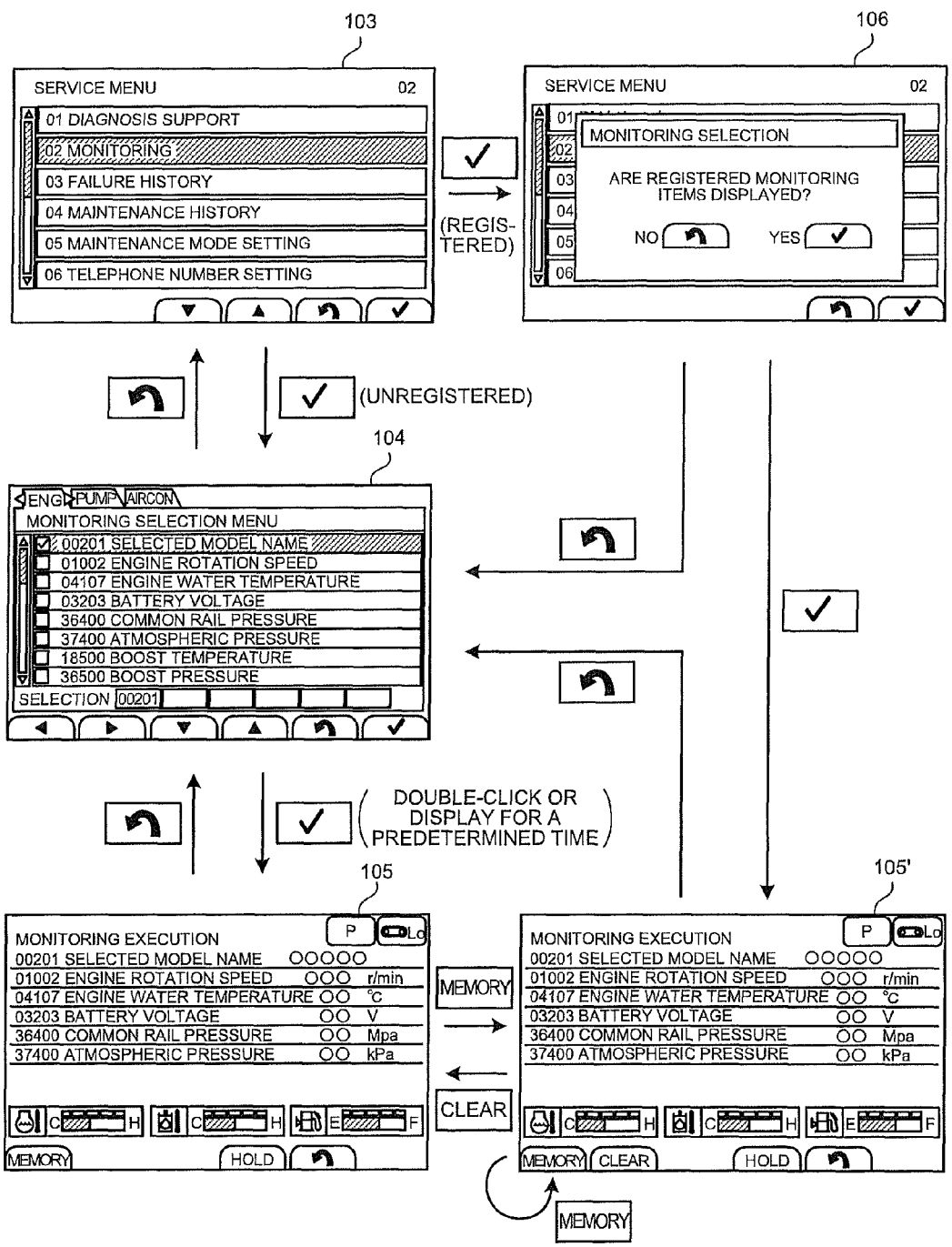
FIG. 7 is a diagram illustrating a screen transition example upon performing monitoring using the operation vehicle monitoring device according to Embodiment 1 of the present invention.

FIG. 7 is a diagram illustrating a screen transition example upon performing monitoring using the monitoring device 21. When the manager performs monitoring, first, the "monitoring" menu is selected from the service menu display screen 103.

Figure 8:
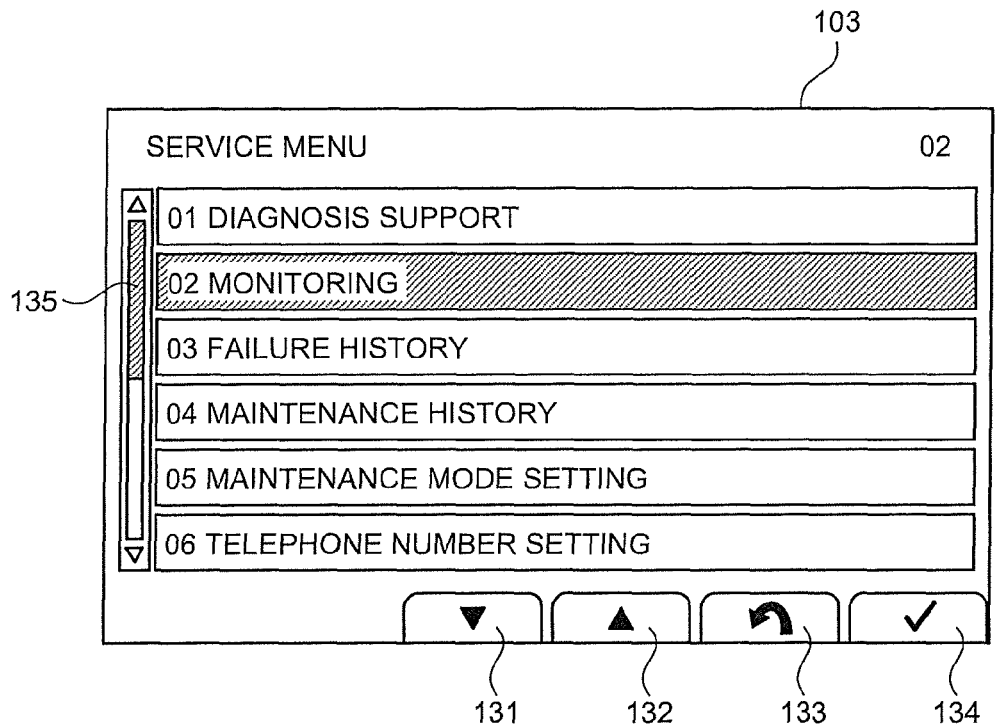
FIG. 8 is a diagram illustrating a display example of a service menu display screen displayed by the operation vehicle monitoring device according to Embodiment 1 of the present invention.

FIG. 8 is a diagram illustrating a display example of the service menu display screen 103. In addition to menus such as "diagnosis support," "monitoring" and "failure history," the service menu screen 103 displays a cursor down icon 131, a cursor up icon 132, a back icon 133 and a selection icon 134 in the lower portion of the screen. Among these, the cursor down icon 131 and the cursor up icon 132 denote icons corresponding to switches for moving up or down a scroll bar 135 that scrolls service menus. These icons are displayed above the function switches F3 to F6 (see FIG. 5) to guide input switches that actually require the manipulation input. The case shown in FIG. 8 denotes a case where "monitoring" is selected from the service menu items (which is displayed by hatching). Therefore, when the function switch F6 is pressed in the case shown in FIG. 8, "monitoring" is to be selected.

If "monitoring" is selected in the service menu display screen 103, the controller 203 causes the display unit 202 to display a screen corresponding to "monitoring." The screen displayed by the display unit 202 varies depending on whether there is a monitoring item registered in the memory 206. To be more specific, if a monitoring item is not registered in the memory 206, the controller 203 causes the display unit 202 to display a monitoring item selection screen 104 for requesting monitoring item selection. By contrast, if a monitoring item is registered in the memory 206, the controller 203 causes the display unit 202 to display an inquiry screen 106 for making an inquiry as to whether to display the registered monitoring item.

Figure 9:
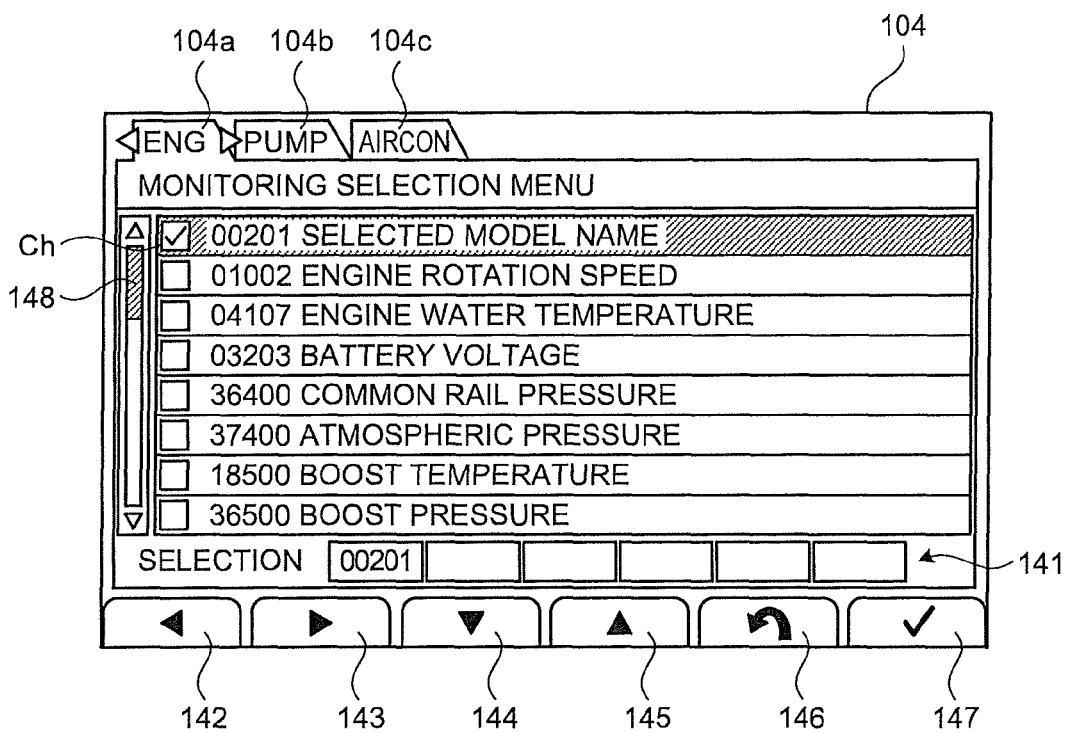
FIG. 9 is a diagram illustrating a display example of a monitoring item selection screen displayed by the operation vehicle monitoring device according to Embodiment 1 of the present invention.

FIG. 9 is a diagram illustrating a display example of the monitoring item selection screen 104. In the monitoring item selection screen 104 shown in the figure, items to be monitored are selected from a plurality of items (for example, 200 items) that can be monitored in the construction machine. Therefore, on the upper portion of the screen, the monitoring item selection screen 104 displays a plurality of tabs 104a to 104c that can switch and display the screen corresponding to each of components such as the engine and the hydraulic pump mounted on the construction machine, and, on the central portion of the screen, it displays monitoring items related to a selected tab. To be more specific, a tab 104a displayed as "ENG," a tab 104b displayed as "PUMP" and a tab 104c displayed as "AIRCON" are displayed. Monitoring items related to the engine (such as the engine rotation speed) are displayed when the tab 104a is opened, monitoring items related to the hydraulic pump (such as a pump injection pressure) are displayed when the tab 104b is opened, and monitoring items related to the air conditioner (such as a driver's cabin temperature and an outside air temperature) are displayed when the tab 104c is opened In the case shown in FIG. 9, the tag 104a is selected and monitoring items related to the engine are displayed together with their identification numbers. An unselected monitoring item is displayed in, for example, blue in color. The displayed monitoring items shown in FIG. 9 include "selected model name (identification number of 00201)" indicating the name of a selected model, "engine rotation speed (identification number of 01002)" indicating the engine rotation speed, "engine water temperature (identification number of 04107)" indicating the water temperature of engine cooling water, "battery voltage (identification number of 03203)" indicating the battery voltage of the engine, "common rail pressure (identification number of 36400)" for detecting the common rail pressure of the fuel injection device, "atmospheric pressure (identification number of 37400)" for detecting the atmospheric pressure, "boost temperature (identification number of 18500)" for detecting the boost temperature equivalent to the temperature of air provided by a turbocharger (or supercharger) mounted on the engine, and "boost pressure (identification number of 36500)" for detecting the boost pressure equivalent to the pressure of air provided by the turbocharger. Here, monitoring items other than the above can be displayed by scrolling the screen.

In the left edge portion of each monitoring item, a checkbox "Ch" indicating whether the item has been selected is displayed. Also, below the monitoring items, there is provided an identification number display area 141 for displaying the identification number of a selected monitoring item. In the case shown in FIG. 9, since only "00201 selected model name" is selected, the checkbox "Ch" on the left edge portion of this monitoring item is checked, the monitoring item that has been selected is displayed in, for example, red in color, and only the identification number "00201" is displayed in the identification number display area 141.

Below the monitoring item selection screen 104, a left shift icon 142 and a right shift icon 143 for tab selection, a cursor down icon 144, a cursor up icon 145, a back icon 146 and a selection icon 147 are displayed in this order from the left. These icons are displayed above the function switches F1 to F6, respectively, to guide switches that actually require the manipulation input. Also, in the monitoring item selection screen 104, on the left side of the selection menu, there is displayed a scroll bar 148 scrolled up or down by the function switches F3 and F4 corresponding to the cursor down icon 144 and the cursor up icon 145.

There are two input methods upon selecting a monitoring item. As a first input method, there is a method of: aiming to an intended monitoring item by shifting the scroll bar 148 while pressing the function switches F3 and F4 corresponding to the cursor down icon 144 and the cursor up icon 145; and then pressing the function switch F6 corresponding to the selection icon 147 for selection. In this first method, the aimed monitoring item is displayed in, for example, yellow in color. Then, when the function switch F6 is pressed, the controller 203 changes the display color of the selected monitoring item from yellow to red in color and displays a check sign on the checkbox Ch of the monitoring item. In the monitoring item selection screen 104, after one monitoring item has been selected, it is possible to select a plurality of monitoring items by repeating the same processing. In a case of finishing monitoring item registration, the function switch F6 may be double-clicked or pressed for a predetermined time or more. The controller 203 having detected a signal corresponding to this exit operation causes the display unit 202 to display a monitoring execution screen 105 for displaying a detection result of the selected monitoring items.

As a second input method for selecting a monitoring item, there is a method of directly inputting the monitoring item identification number. In a case where the monitoring item selection screen 104 is displayed, when a switch having a number in its lower right portion is pressed among the switches of the input unit 201 other than the function switches F1 to F6, the number is input. To be more specific, for example, the number "1" is described in the lower right portion of the auto decel switch 211, and, when the auto decel switch 211 is pressed in a state where the monitoring item selection screen 104 is displayed, a signal corresponding to the number "1" is input. An identification number is input in this way, and, when the function switch F6 is pressed, the controller 203 processes a monitoring item corresponding to the input identification number, as a selected state. In this case, by inputting another identification number after pressing the function switch F6, it is possible to newly select another monitoring item. In the case of finishing monitoring item selection, the function switch F6 may be continuously pressed two times. By this means, the controller 203 causes the display unit 202 to display the monitoring execution screen 105.

Figure 10:
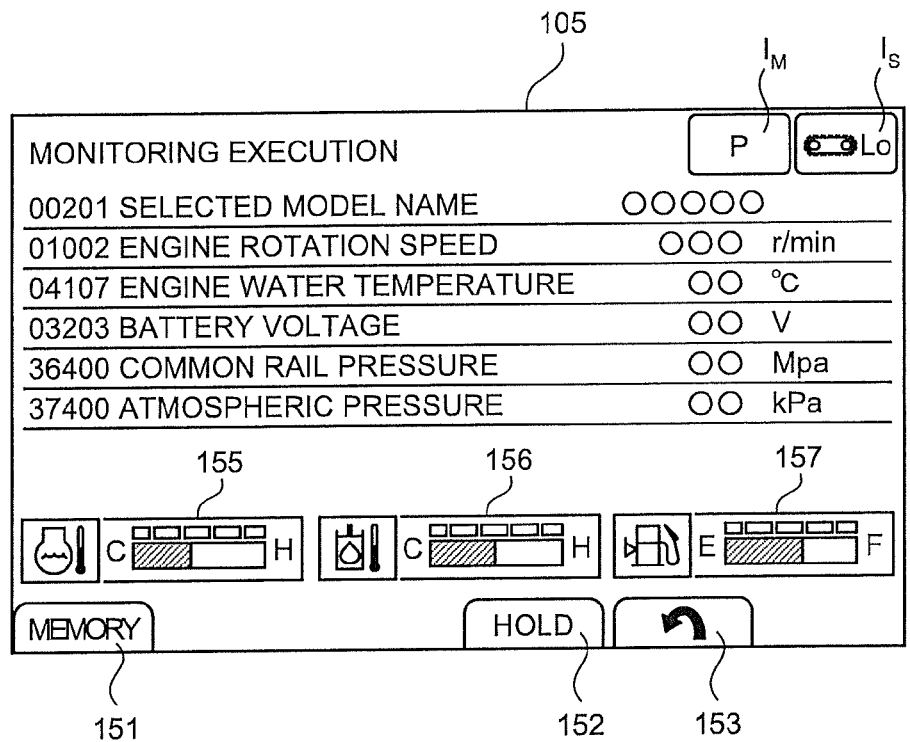
FIG. 10 is a diagram illustrating a display example of a monitoring execution screen in a case where monitoring items are not registered in a storage unit, in the operation vehicle monitoring device according to Embodiment 1 of the present invention.

FIG. 10 is a diagram illustrating a display example of the monitoring execution screen 105. The monitoring execution screen 105 illustrated in the figure numerically displays the detection values of "selected model name," "engine rotation speed," "engine water temperature," "battery voltage," "common rail pressure" and "atmospheric pressure" on each item row. The items displayed on the monitoring execution screen 105 denote items selected in the monitoring item selection screen 104 of FIG. 9 by the manager so as to perform monitoring. Therefore, the monitoring items displayed on the monitoring execution screen 105 of FIG. 10 are mere examples. The specific detection result of each monitoring item is sequentially updated.

Also, below the monitoring result, the monitoring execution screen 105 displays an engine water temperature gauge 155, an operating oil temperature gauge 156 and a fuel level gauge 157 in a simple manner. Further, below the engine water temperature gauge 155 or the like, a memory icon 151, a hold icon 152 and a back icon 153 are displayed. Here, the "display in a simple manner" means that the state quantity levels of the engine cooling water temperature, the operating oil temperature and the remaining fuel amount in a fuel tank are displayed by bars and the type of each state quantity is displayed by graphic (or pattern). Also, instead of the bar display, each state quantity described above may be displayed by absolute value (such as degrees Celsius and litter) and, in the case of the remaining fuel amount, it may be numerically displayed by percent display. Thus, by displaying each state quantity by graphic, the service personnel and the like can confirm that there is no abnormality (such as overheat due to high temperature of the engine cooling water temperature) of the state of the construction machine even when the monitoring execution screen 105 is displayed.

Also, on the upper right portion of the monitoring execution screen 105, the operation mode icon $I_M$ and the running velocity stage icon $I_S$ are displayed. The memory icon 151 is displayed on a position corresponding to the function switch F1 and denotes an icon having a function of inputting a signal that instructs the memory 206 to register a displayed monitoring item. Also, the hold icon 152 is displayed on a position corresponding to the function switch F4 and denotes an icon having a function of fixing and displaying an image displayed by the display unit 202 and recording the fixed image data in the memory 206 as a snapshot. By providing such the hold icon 152, it is possible to memorize the instant numerical value of a changed image as a snapshot, so that it is possible to provide a better visibility for the manager upon performing failure diagnosis or examination and easily and reliably record the numerical value in an examination table or the like. The back icon 153 is displayed on a position corresponding to the function switch F5.

After the display screen becomes a hold state by pressing the function switch F4 corresponding to the hold icon 152 when the display unit 202 is displaying the monitoring execution screen 202, if the function switch F4 is pressed again, the controller 203 cancels the hold state. Here, a hold cancellation icon (corresponding to, for example, the function switch F3) may be displayed after the display screen becomes a hold state. In this case, the controller 203 cancels the hold state when the function switch F3 is pressed. By providing such a hold function, for example, when the manager checks the battery voltage, it is possible to read the voltage value displayed in a hold state instead of the voltage value that instantly varies, so that the manager can reliably record the voltage value in an examination table.

Figure 11:
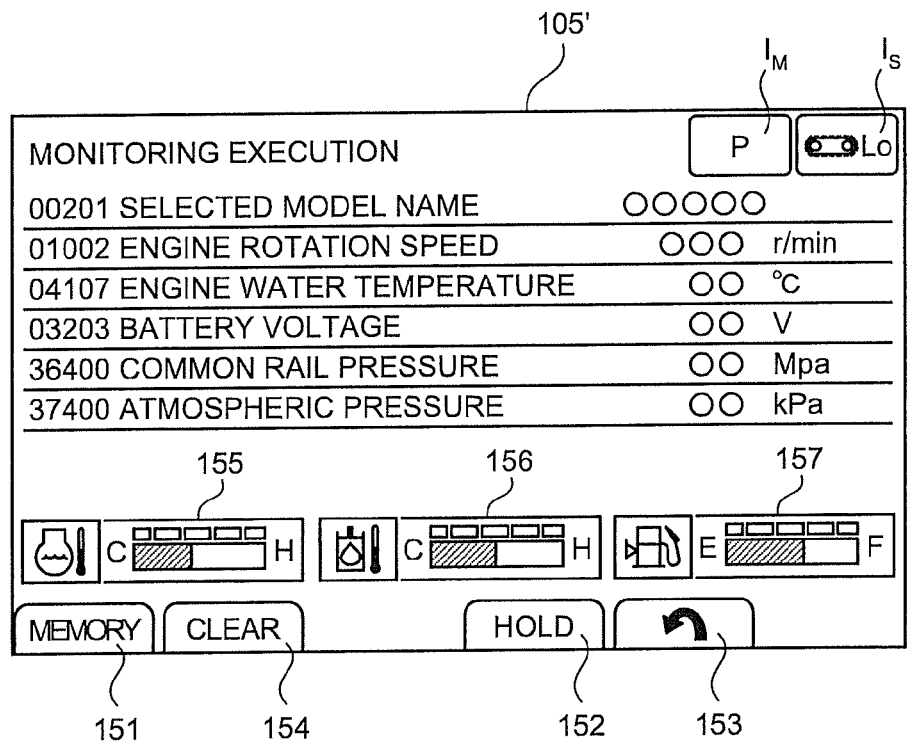
FIG. 11 is a diagram illustrating a display example of a monitoring execution screen in a case where monitoring items are registered in the storage unit, in the operation vehicle monitoring device according to Embodiment 1 of the present invention.

FIG. 11 is a diagram illustrating a display example of the monitoring execution screen after pressing the function switch F1 while the display unit 202 displays the monitoring execution screen 105 and then registering displayed monitoring items in the memory 206, which is an enlarged view of a monitoring execution screen 105' in FIG. 7. The monitoring execution screen 105' shown in FIG. 11 displays a clear icon 154 on the right side of the memory icon 151 in addition to the display content of the monitoring execution screen 105. The clear icon 154 is displayed above the function switch F2 and denotes a switch having a function of deleting the monitoring items registered in the memory 206. Therefore, when the function switch F2 is pressed, the controller 203 deletes the registered monitoring items from the memory 206. After the registered monitoring items are deleted from the memory 206, the controller 203 causes the display unit 202 to display the monitoring execution screen 105 again. Here, when the function switch F1 corresponding to the memory icon 151 is pressed while the monitoring execution screen 105' is displayed, the controller 203 overwrites and stores a monitoring item to be registered, in the memory 206. At this time, the display unit 202 continues displaying the monitoring execution screen 105'.

Figure 12:
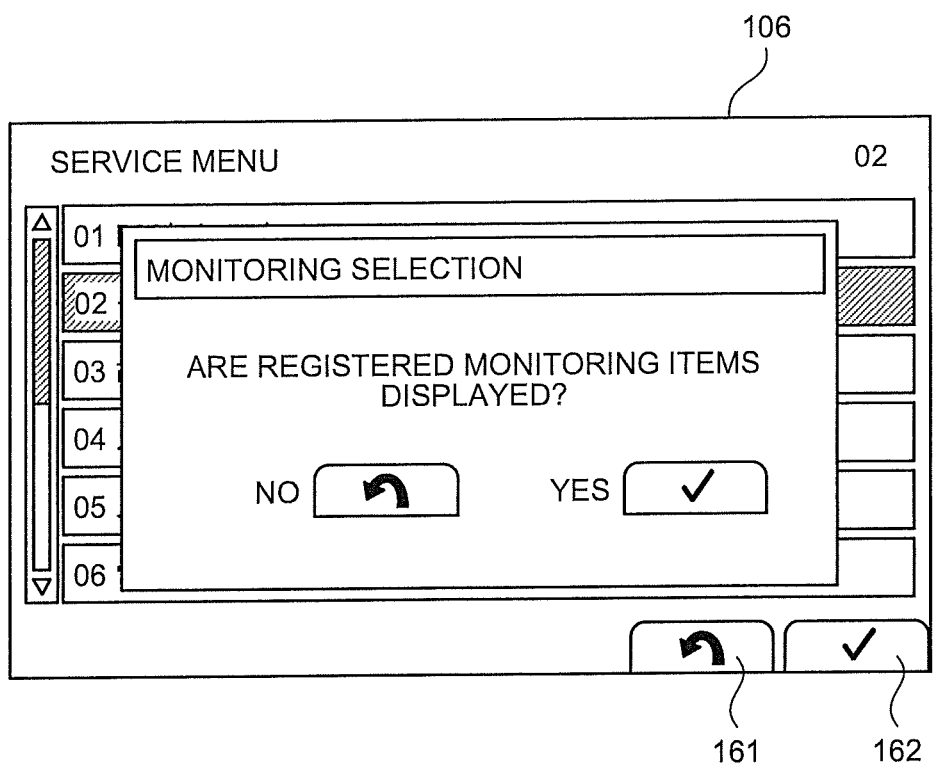
FIG. 12 is a diagram illustrating a display example of an inquiry screen displayed by the display unit when a monitoring storage unit registers monitoring items in a case where "monitoring" is selected in a service menu display screen displayed by the operation vehicle monitoring device according to Embodiment 1 of the present invention.

FIG. 12 is a diagram illustrating a display example of an inquiry screen that is screen transitioned when a monitoring item is registered in the memory 206 in a case where "monitoring" is selected in the service menu display screen 103. On the service menu display screen 103, the inquiry screen 106 shown in the figure displays a message "Are registered monitoring items displayed?", messages "No" and "Yes" and a back icon 161 and selection icon 162 corresponding to "No" and "Yes." If the function switch F5 corresponding to "No" (i.e. the back icon 161) in the state shown in FIG. 12 is pressed, the controller 203 causes the display unit 202 to display the monitoring item selection screen 104. By contrast, if the function switch F6 corresponding to "Yes" (i.e. the selection icon 162) in the state shown in FIG. 12 is pressed, the controller 203 causes the display unit 202 to display the monitoring execution screen 105'.

Figure 13:
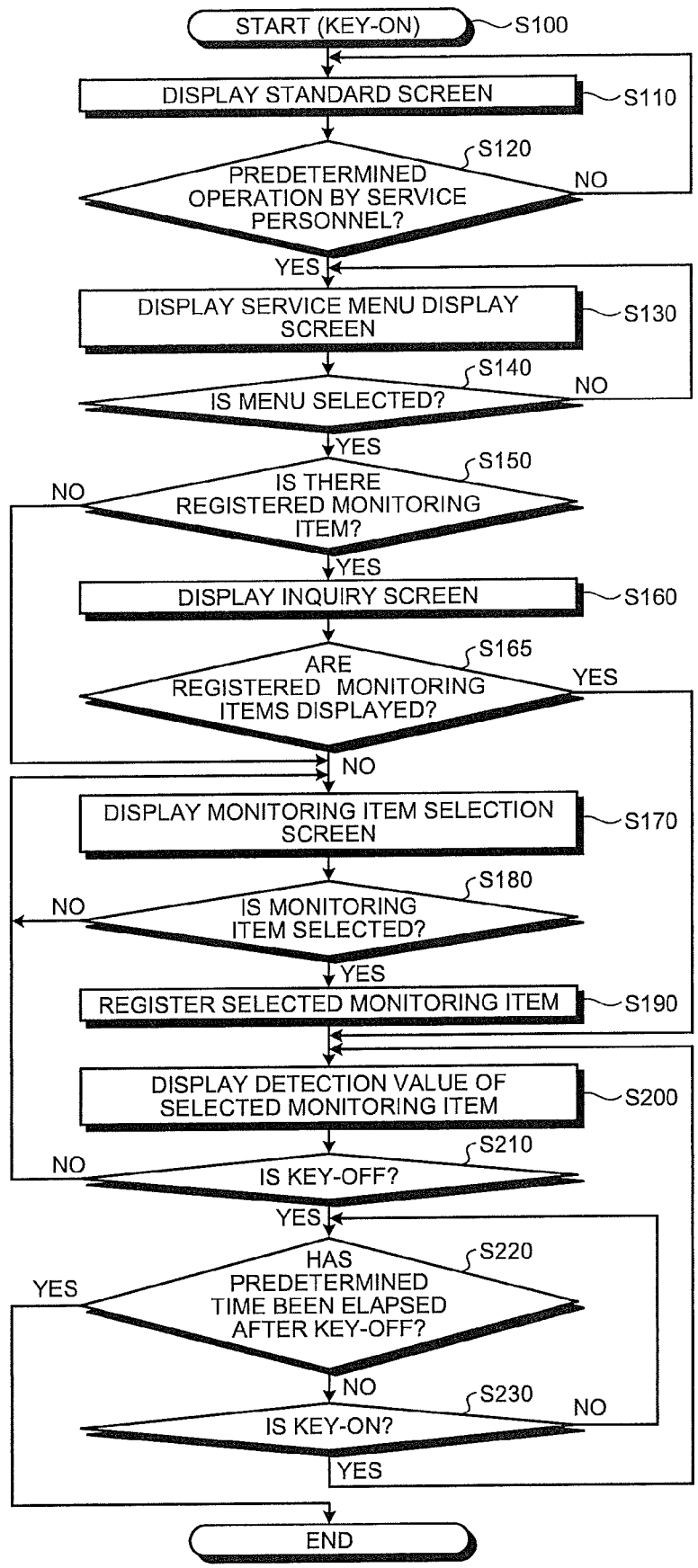
FIG. 13 is a schematic flowchart collectively illustrating control examples of screen transition upon performing monitoring using the operation vehicle monitoring device according to Embodiment 1 of the present invention.

FIG. 13 is a schematic flowchart collectively illustrating control examples of screen transition shown in above FIG. 7 (FIG. 8 to FIG. 12). First, by activating the key switch 41 (step S100), the standard screen 101 is displayed on the display unit 202 (step S110). Then, if a service personnel performs a predetermined operation such as a password input (step S120: Yes), the display of the display unit 202 is transitioned from the standard screen 101 to the service menu display screen 103 (step S130). If there is no predetermined operation (step S120: No), the standard screen 101 is displayed as is. Next, if an intended menu is selected on the service menu screen 103 (step S140: Yes), it is determined whether there is a registered monitoring item (step S150). If there is a registered monitoring item (step S150: Yes), the display unit 202 is caused to display the inquiry screen 106 (step S160) to select whether the registered monitoring item is displayed (step S165).

If there is no registered monitoring item (step S150: No) or it is selected that a registered monitoring item is not displayed (step S165: No), the display of the display unit 202 is transitioned to the monitoring item selection screen 104 (step S170). Then, an intended monitoring item is selected (step S180). If an intended monitoring item is selected (step S180: Yes), the selected monitoring item is registered in a memory according to an operation of "CHECK" button corresponding to the function switch F6 to an operation of "MEMORY" button corresponding to the function switch F1 (step S190). Then, for example, a detection value of the selected monitoring item is displayed on the monitoring execution screen 105 as the current detection content (step S200). If it is selected that the registered monitoring item is displayed (step S165: Yes), it is directly transitioned to the monitoring execution screen 105' not via steps S170 to S190 to display, for example, a detection value of the selected monitoring item as the current detection content (step S200).

After that, processing in steps S170 to S200 is repeated (step S210: No) until the key switch 41 is turned off, and, when the key switch 41 is turned off (step S210: Yes), it is determined whether a predetermined time is elapsed after the key-off state (step S220). For example, it is presumed that the predetermined time in this case denotes a time period during which the service personnel performs an operation. If the predetermined time is not elapsed (step S220: No), it is determined whether the key switch 41 is turned on (step S230). If the key switch 41 is turned on again in the predetermined time (step S220: No, step S230), for example, the detection value (i.e. the current detection content) of the registered monitoring item is displayed on the monitoring execution screen 105 or 105'. When the predetermined time is elapsed after the key-off state (step S220: Yes), processing is finished.

In Embodiment 1 of the present invention described above, in a case where the monitoring item is selected in the service menu display screen 103, if a monitoring item is registered in the memory 206, it is transitioned to the monitoring execution screen 105' via the inquiry screen 106, so that it is not necessary to select a monitoring item in each case. Therefore, it is possible to efficiently perform monitoring when the manger performs maintenance.

Embodiment 2

Configurations of a monitoring device and a control system including the monitoring device according to this Embodiment 2 are similar to the configurations of the monitoring device 21 and the control system explained in above Embodiment 1. In the following, each component of the monitoring device and the control system will be explained with the same reference numerals as in FIG. 5.

Figure 14:
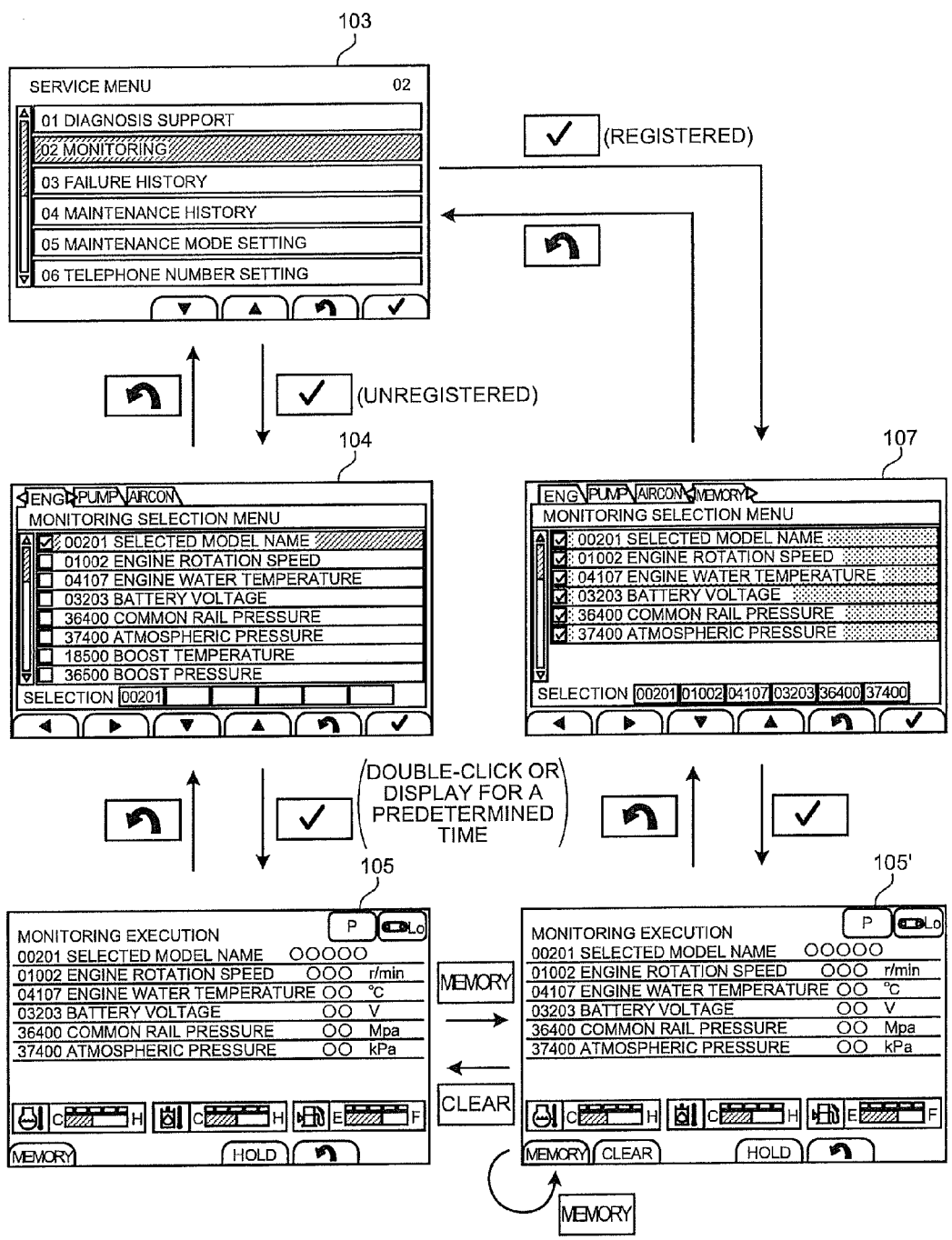
FIG. 14 is a diagram illustrating a screen transition example upon performing monitoring in an operation vehicle monitoring device according to Embodiment 2 of the present invention.

FIG. 14 is a diagram illustrating a screen transition example in the display unit 202 of the monitoring device 21 in a case of performing monitoring using the monitoring device 21. When the manager performs monitoring, first, the "monitoring" menu is selected from the service menu display screen 103.

When "monitoring" is selected in the service menu display screen 103, the controller 203 causes the display unit 202 to display a screen corresponding to "monitoring." The screen displayed by the display unit 202 varies depending on whether there is a monitoring item registered in the memory 206.

If there is no monitoring item registered in the memory 206, the controller 203 causes the display unit 202 to display the monitoring item selection screen 104 shown in FIG. 9. By double-clicking or pressing the function switch F6 corresponding to the selection icon 147 (see FIG. 9) for a predetermined time or more in a state where the monitoring item selection screen 104 is displayed, the controller 203 causes the display unit 202 to display the monitoring execution screen 105 shown in FIG. 10.

Figure 15:
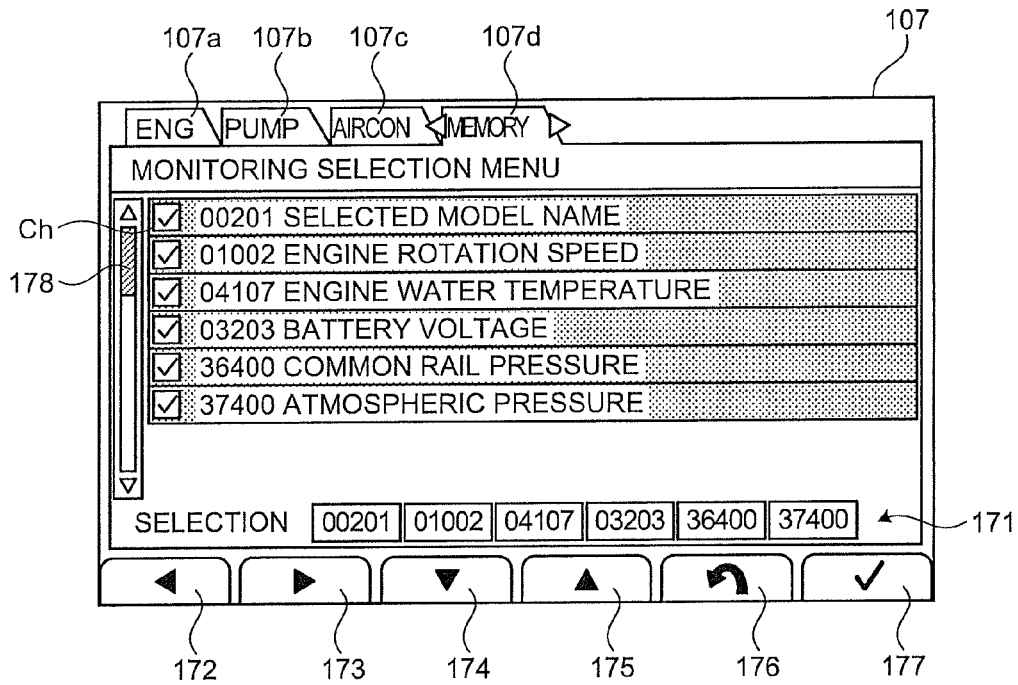
FIG. 15 is a diagram illustrating a display example of a monitoring item selection screen displayed by a display unit when a storage unit registers monitoring items in a case where "monitoring" is selected in a menu selection screen displayed by the operation vehicle monitoring device according to Embodiment 2 of the present invention.

Next, a case will be explained where there is a monitoring item registered in the memory 206. In this case, the controller 203 causes the display unit 202 to display a monitoring item selection screen 107 different from the above monitoring item selection screen 104. FIG. 15 is a diagram illustrating a display example of the monitoring item selection screen 107. The monitoring item selection screen 107 shown in FIG. 15 displays the monitoring item selection screen 107, an identification number display area 171, a left shift icon 172, a right shift icon 173, a cursor down icon 174, a cursor up icon 175, a back icon 176, a selection icon 177 and a tab 107d displayed as "MEMORY" in addition to a plurality of tabs 107a to 107c corresponding to the plurality of tabs 104a to 104c of the monitoring item selection screen 104 in FIG. 9, where the tab 107d is opened. The tab 107d displays monitoring items registered in the memory 206 (i.e. "selected model name," "engine rotation speed," "engine water temperature," "battery voltage," "common rail pressure" and "atmospheric pressure").

In the display state of FIG. 15, if the function switch F6 corresponding to the selection icon 177 is pressed, the controller 203 causes the display unit 202 to display the monitoring execution screen 105' shown in FIG. 11. The screen transition between the monitoring execution screen 105' and the monitoring execution screen 105 is the same as in Embodiment 1 described above.

Figure 16:
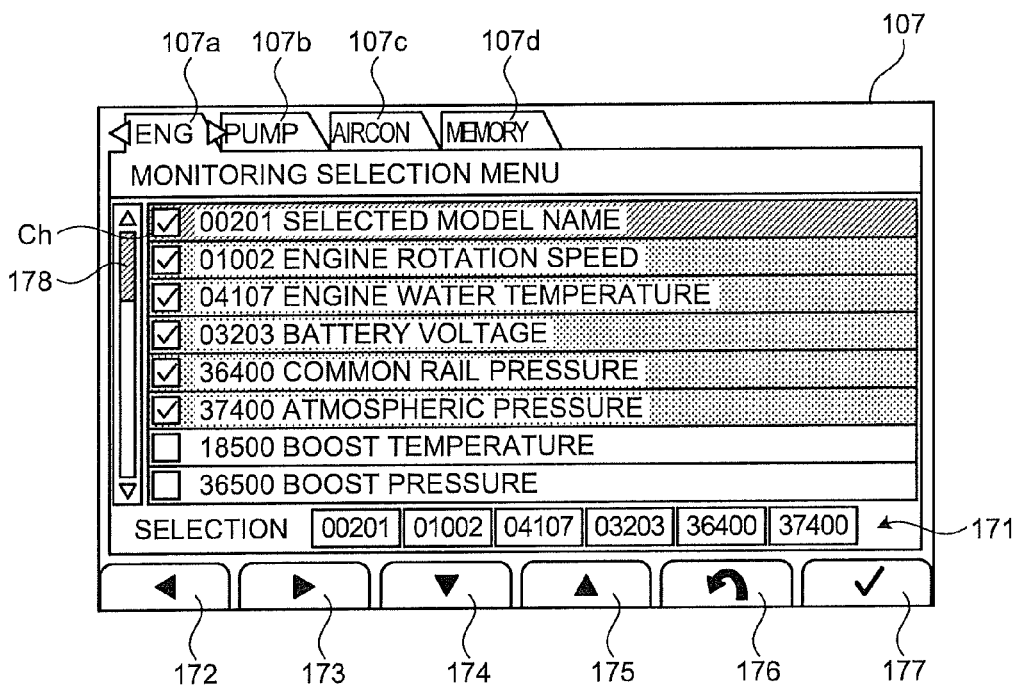
FIG. 16 is a diagram illustrating a display example of a monitoring item selection screen displayed by the operation vehicle monitoring device according to Embodiment 2 of the present invention.

Here, from the display state of FIG. 14, it is possible to transition to screens other than the monitoring execution screen 105' shown in FIG. 13. To be more specific, when a tab is shifted by using the function switches F1 and F2 corresponding to the left shift icon 172 and the right shift icon 173, the display unit 202 displays monitoring items based on a selected tab. FIG. 16 is a diagram illustrating a display example of monitoring selection menus in a case where the tab 107a displayed as "ENG" is selected after the state of the monitoring item selection screen 107 shown in FIG. 15 (i.e. the state where the tab 107d is selected). FIG. 16 illustrates a state where the monitoring items registered in the memory 206 by the monitoring item selection screen 107 shown in FIG. 15 are all registered. Here, although FIG. 15 illustrates a state where only the monitoring items included in the tab 107a are registered in the memory 206, this is a mere example, and a case is possible where the monitoring items included in the tab 107b (PUMP) or the tab 107c (AIRCON) are registered in the memory 206.

In a state where the display unit 202 displays the monitoring item selection screen 107 shown in FIG. 16, when the key-function switch F6 is pressed after an unregistered monitoring item becomes a selected state (displayed in yellow in color) by shifting the scroll bar 178 using, for example the function switches F3 and F4, the controller 203 processes the selected monitoring item as a registration state, changes the display color in the screen from yellow to red in color and displays a check sign on the checkbox Ch of the monitoring item. Meanwhile, when a registered monitoring item becomes a selected state ("00201 selected model name" in FIG. 16) by shifting the scroll bar 178 as above and the function switch F6 is further pressed, the controller 203 processes the selected monitoring item as an unregistered state, changes the display color in the screen to blue in color and deletes a check sign from the checkbox Ch of the monitoring item.

Thus, after the controller 203 adds or deletes a monitoring item to be registered in the memory 206, when the function switch F6 is double-clicked or pressed for a predetermined time or more, the controller 203 causes the display unit 202 to display the monitoring execution screen 105. Here, in a case of adding or deleting a monitoring item, it is possible to employ an input method (i.e. the second input method described above) of directly inputting an identification number.

According to Embodiment 2 of the present invention described above, in a case where monitoring is selected in the service menu display screen 103, when a monitoring item is registered in the memory 206, the display unit 202 displays the registered monitoring items for each tab upon displaying the monitoring item selection screen 107, so that the manager can confirm which monitoring items are registered before execution of the monitoring. Also, in Embodiment 2, it is easily possible to add or delete a monitoring item in the memory 206, so that it is possible to perform monitoring more efficiently.

Embodiment 3

It is an object of Embodiment 3 of the present invention to efficiently perform monitoring in a case where a key-on or key-off operation is performed while monitoring the state quantities of the engine cooling water temperature, the operating oil temperature and the remaining fuel amount in the fuel tank for the manager's failure diagnosis of the construction machine.

FIG. 17 is a diagram illustrating an outline of characteristic processing in monitoring processing performed by a monitoring device according to Embodiment 3 of the present invention. Here, a configuration of a control system including the monitoring device according to Embodiment 3 is the same as the configuration of the control system 1 explained in above Embodiment 1. In Embodiment 3, when a key-off signal is input by the key witch 41 in a state where the monitoring execution screen is displayed, the controller 203 turns off the light of the display unit 202 and registers the monitoring items displayed by the monitoring execution screen 105a in the memory 206.

After that, when a key-on signal is input by the key switch 41 and the signal detection unit 205 detects the key-on signal, the controller 203 calls up information of the monitoring execution screen 105b in which the monitoring items registered immediately after the key-off state are selected, from the memory 206 and causes the display unit 202 to display them. Here, it is needless to say that detection results are generally different between the monitoring execution screens 105a and 105b.

According to Embodiment 3 described above, when a key-on signal is input by the key switch 41, since the controller 203 causes the display unit 20 to display a screen before a key-off state (i.e. monitoring items registered in the memory 206), in the case of checking a mechanical behavior upon the key-on state, it is not necessary to transition to the service menu display screen 103 via the standard screen upon the key-on state and select the "monitoring" menu. Therefore, it is possible to efficiently perform monitoring.

Here, in Embodiment 3, it is possible to perform a normal monitoring operation in the key-on state in the same way as in Embodiments 1 and 2 described above.

Figure 18:
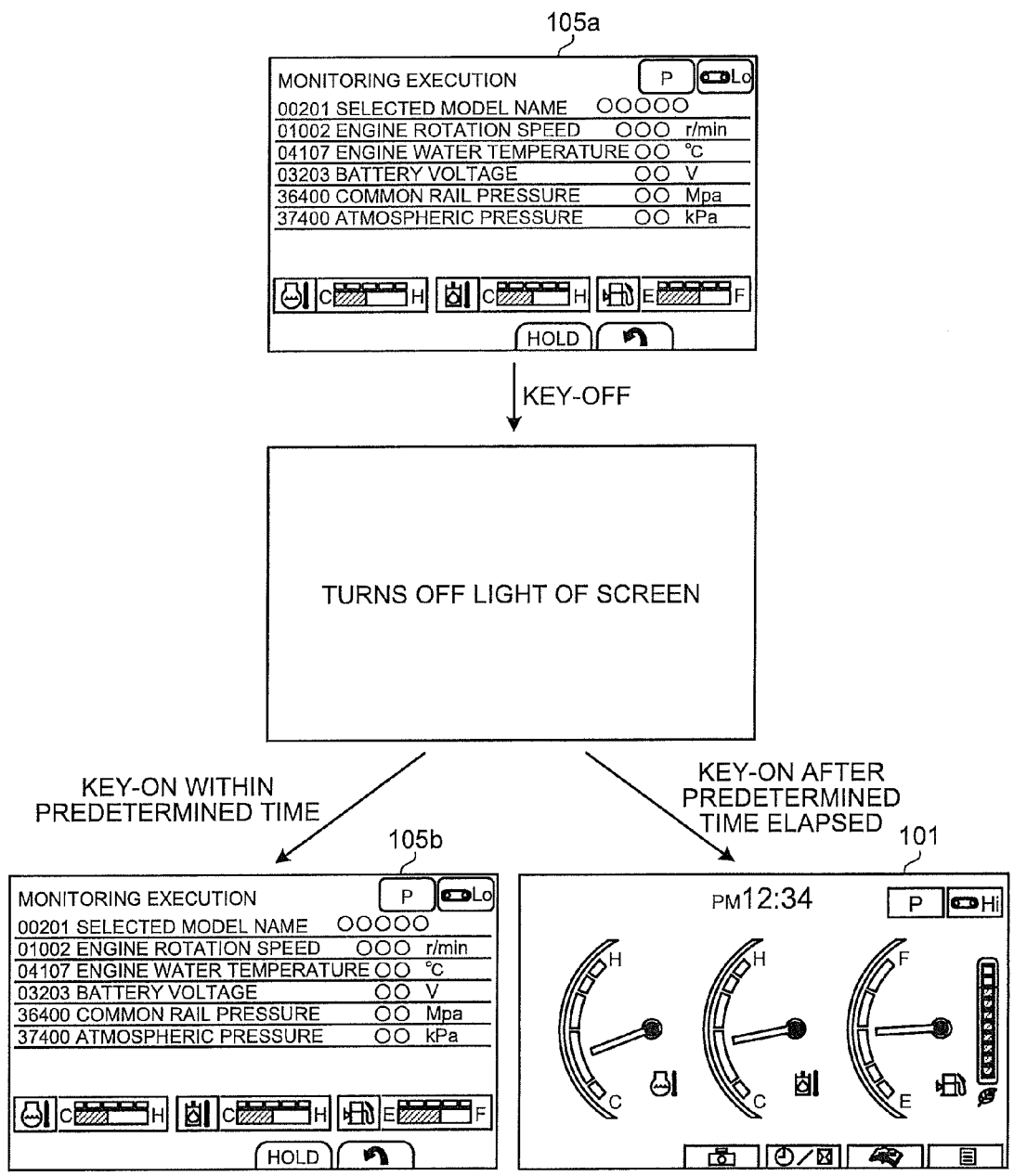
FIG. 18 is a diagram illustrating an outline of characteristic processing in monitoring processing performed by a monitoring device according to a modification example of Embodiment 3 of the present invention.

FIG. 18 is a diagram illustrating an outline of characteristic processing in the monitoring device according to a modification example of Embodiment 3. The monitoring device according to this modification example has a function of changing a screen displayed by the display unit 202 immediately after a key-on signal is detected, according to time from when the signal detection unit 205 detects a key-off signal till when it detects the key-on signal.

In this modification example, when the signal detection unit 205 detects a key-off signal in a state where the display unit 202 displays the monitoring execution screen 105a, the controller 203 turns off the light of the display unit 202. After that, when the signal detection unit 205 detects a key-on signal within a predetermined time after the key-off signal is detected, the controller 203 causes the display unit 202 to display the monitoring execution screen 105b. By contrast, when the signal detection unit 205 detects the key-on signal in the predetermined time is elapsed after the key-off signal is detected, the controller 203 causes the display unit 202 to display the standard screen 101 in the same way as in the case of normal activation. Here, the elapsed time from detection of the key-on signal in the signal detection unit 205 is measured by the clock IC 204.

Also, regarding the predetermined time that is a threshold used when the controller 203 determines which of the standard screen 101 and the monitoring execution screen 105a is displayed on the display unit 202, it is adequately determined taking into account the required time from when the manager sets a key-off state till when the manager sets a key-on state upon monitoring, and, when the key-on state is set in the predetermined time, it may be determined that there is a high possibility that a general user sets the key-on state.

According to the modification example of Embodiment 3, for example, in a case where the manager finishes maintenance without finishing a service menu, when a general user subsequently activates the construction machine, the standard screen 101 is displayed, so that it is possible to prevent the monitoring execution screen from being displayed when the general user starts an operation. Therefore, the general user can perform a normal operation without feeling uncomfortable.

Although preferred embodiments to implement the present invention have been described above, the present invention is not limited to only Embodiments 1 to 3 described above. For example, the monitoring device according to an aspect of the present invention can be mounted on a construction machine such as a bulldozer and a wheel loader. That is, the present invention includes various embodiments other than the above.

INDUSTRIAL APPLICABILITY

As described above, an operation vehicle monitoring device according to an aspect of the present invention is useful for an operation vehicle such as a construction machine, and is specifically suitable to a case where maintenance is performed for an operation vehicle.

REFERENCE SIGNS LIST 21 monitoring device
104, 107 monitoring item selection screen
104a to 104c, 107a to 107d tab
105, 105', 105a, 105b monitoring execution screen
106 inquiry screen
133, 146, 133, 153, 161, 176 back icon
134, 147, 162, 177 selection icon
141, 171 identification number display area
151 memory icon
152 hold icon
154 clear icon
201 input unit
202 display unit
203 controller
205 signal detection unit
206 memory

The invention claimed is:

1. An operation vehicle monitoring device, including a display unit configured to display a standard screen that displays state quantity of at least engine water temperature and remaining fuel amount as an operation state of an operation vehicle, and a service menu display screen for performing a maintenance and setting of the operation vehicle, and the service menu display screen being transitioned from the standard screen by a manager's predetermined operation and displayed, where
the service menu display screen displays a plurality of menus related to the maintenance and setting of the operation vehicle, a monitoring item selection screen is shifted and displayed in which it is possible to select a plurality of monitoring items corresponding to a selected menu in case where one of the plurality of menus is selected, and the display unit displays a monitoring item selected from the plurality of monitoring items related to the operation state of the operation vehicle, comprising:
an input unit configured to input, by the manager, a signal that instructs a registration of the selected monitoring item;
a storage unit configured to register the monitoring item according to the input signal by the instruction of the registration;
a display control unit configured to force the display unit to display the monitoring item registered in the storage unit; and
a signal detection unit configured to detect a key-on signal and a key-off signal generated when a key switch of the operation vehicle is turned on and off respectively, and wherein
when the monitoring item registered in the storage unit is displayed in the display unit by the manager's predetermined operation, the display unit displays, in a same screen, the monitoring item registered in the storage unit, the current detection content of the monitoring items registered in the storage unit, and the state quantity of the engine water temperature and the remaining fuel amount and displays, by a graphic or a character, the state quantity, and
the display unit further displays a type of the state quantity by a graphic,
the monitoring device comprises a function of changing a screen displayed by the display unit immediately after a key-on signal is detected, according to time from when the signal detection unit detects a key-off signal when a key-off is performed in a case that the current detection content of the monitoring items is displayed in the display unit till when the signal detection unit detects the key-on signal, and the function comprises that:

in a case where the signal detection unit detects the key-on signal before a predetermined time has elapsed after detecting the key-off signal, the display control unit forces the display unit to display the current detection content of the monitoring items registered in the storage unit, and in a case where the signal detection unit detects the key-on signal after the predetermined time has elapsed after detecting the key-off signal, the display control unit forces the display unit to display the standard screen.

2. The operation vehicle monitoring device according to claim 1, wherein the display unit displays a plurality of tabs that can be switched to each other in a screen displaying the plurality of monitoring items, and one of the plurality of tabs corresponds to a screen displaying a list of monitoring items registered in the storage unit.

3. The operation vehicle monitoring device according to claim 1, wherein the monitoring item relates to a hydraulic pump and/or an engine mounted on the operation vehicle.

* * * * *